(12) United States Patent
Baartmans et al.

(10) Patent No.: US 10,114,729 B2
(45) Date of Patent: Oct. 30, 2018

(54) PERFORMANCE ANALYSIS USING PERFORMANCE COUNTERS AND TRACE LOGIC

(71) Applicant: QUALCOMM Incorporated, San Diego, CA (US)

(72) Inventors: Sean Todd Baartmans, Cary, NC (US); Zainab Zaidi, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/086,057

(22) Filed: Mar. 31, 2016

(65) Prior Publication Data

US 2017/0286260 A1 Oct. 5, 2017

(51) Int. Cl.
G06F 11/00 (2006.01)
G06F 11/36 (2006.01)
G06F 9/46 (2006.01)
G06F 11/34 (2006.01)

(52) U.S. Cl.
CPC .......... *G06F 11/3636* (2013.01); *G06F 9/466* (2013.01); *G06F 11/3409* (2013.01); *G06F 11/3466* (2013.01)

(58) Field of Classification Search
CPC .................................................. G06F 11/3636
USPC .......... 714/47.1, 47.2, 47.3, 48, 49, 50, 38.1
See application file for complete search history.

(56) References Cited

U.S. PATENT DOCUMENTS

| | | | |
|---|---|---|---|
| 7,080,283 B1 | 7/2006 | Songer et al. | |
| 7,359,994 B1 | 4/2008 | Lakhanpal et al. | |
| 8,140,903 B2 | 3/2012 | Goodman et al. | |
| 8,706,937 B2 | 4/2014 | Cruickshank et al. | |
| 2005/0039171 A1* | 2/2005 | Avakian .............. | G06F 11/3495 717/127 |
| 2010/0058345 A1* | 3/2010 | Seidman ............. | G06F 11/3419 718/101 |
| 2010/0153261 A1* | 6/2010 | Tseng ..................... | G06Q 10/06 705/39 |
| 2010/0287541 A1* | 11/2010 | Saunders ............... | G06Q 30/06 717/139 |
| 2013/0111073 A1 | 5/2013 | Dobbie et al. | |

(Continued)

OTHER PUBLICATIONS

International Search Report and Written Opinion—PCT/US2017/020669—ISA/EPO—dated May 9, 2017.

*Primary Examiner* — Dieu-Minh Le

(74) *Attorney, Agent, or Firm* — Muncy, Geissler, Olds & Lowe, P.C./QUALCOMM

(57) ABSTRACT

Systems and methods for analyzing performance of a processing system are based on performance counters provided in trace points located at selected nodes of the processing system. A first transaction to be monitored is identified as a transaction to be monitored at a first trace point if the transaction is detected, by a performance counter, more than a threshold number of times at the first trace point. A first trace tag identifier is associated with the first transaction at the first trace point. The first transaction is identified at one or more other trace points based on the first trace tag identifier. Based on time stamps at which the first transaction is identified at the trace points, information such as trace information, latency, locality of a consuming device of the first transaction, etc. is obtained from the various trace points.

23 Claims, 5 Drawing Sheets

(56) References Cited

U.S. PATENT DOCUMENTS

2015/0082326 A1\* 3/2015 Milliron .................. G06F 9/542
719/318
2015/0127905 A1\* 5/2015 Chang ................. G06F 12/0871
711/118

\* cited by examiner

PERFORMANCE ANALYSIS USING PERFORMANCE COUNTERS AND TRACE LOGIC

FIELD OF DISCLOSURE

Disclosed aspects pertain to performance analysis of a processing system. More specifically, exemplary aspects relate to performance analysis using performance counters for identifying transactions to be monitored and trace logic for monitoring the identified transactions.

BACKGROUND

Monitoring the performance of a processing system in real time is an important design goal. For example, real time performance monitoring can reveal bottlenecks and provide insight into utilization of bandwidth and resources of the processing system. Some techniques for performance monitoring utilize benchmarks to compare metrics like bandwidth, latencies, etc., of transactions executed by the processing system. Software mechanisms may be used to measure latencies of the transactions at specified time intervals and the measured latencies may be logged for analysis. Hardware mechanisms such as the use of system timers and counters within a processor core may also be used for gathering information about transactions, such as average latencies, overall minimum/maximum latencies, etc. Tracing mechanisms (e.g., Embedded Trace Macrocell (ETM)) which may be used for debugging, can provide real time information regarding the execution flow of transactions.

However, while the above mechanisms seek to provide general information regarding the overall performance of a processing system, it is difficult to discern performance information regarding specific transactions. For example, while combinations of the above-mentioned software and hardware mechanisms can indicate that broad sections of application code may be inefficient, it is difficult to pinpoint problematic transactions with more specificity. On the other hand, while the tracing mechanisms can provide more detailed information about the processing system which can be collected and analyzed, effectively using this information real time may involve prohibitively large amounts of data to be gathered and processed within very small windows of time.

Accordingly, there is a need in the art for systems and methods which can provide real time and detailed performance metrics regarding particular transactions.

SUMMARY

Exemplary aspects of the invention are directed to systems and methods for analyzing performance of a processing system are based on performance counters provided in trace points located at selected nodes of the processing system. A first transaction to be monitored is identified as a transaction to be monitored at a first trace point if the transaction is detected, by a performance counter, more than a threshold number of times at the first trace point. A first trace tag identifier is associated with the first transaction at the first trace point. The first transaction is identified at one or more other trace points based on the first trace tag identifier. Based on time stamps at which the first transaction is identified at the trace points, information such as trace information, latency, locality of a consuming device of the first transaction, etc., is obtained from the various trace points.

For example, an exemplary aspect is directed to method of analyzing performance of a processing system, the method comprising identifying a first transaction as a transaction to be monitored, at a first trace point of the processing system, associating a first trace tag identifier with the first transaction, at the first trace point, and identifying the first transaction at one or more other trace points of the processing system based on the first trace tag identifier.

Another exemplary aspect is directed to a processing system comprising a first trace point configured to identify a first transaction as a transaction to be monitored, trace tagging logic, provided at the first trace point, configured to associate a first trace tag identifier with the first transaction, and one or more other trace points of the processing system, configured to identify the first transaction based on the first trace tag identifier.

Yet another exemplary aspect is directed to an apparatus comprising means for identifying a first transaction as a transaction to be monitored at a first means for tracing in a processing system, means for associating a first trace tag identifier with the first transaction, at the first means for tracing, and means for identifying the first transaction at one or more other means for tracing in the processing system, based on the first trace tag identifier.

Another exemplary aspect is directed to a non-transitory computer-readable storage medium comprising code, which, when executed by a processor, causes the processor to perform operations analyzing performance of a processing system, the non-transitory computer-readable storage medium comprising: code for identifying a first transaction as a transaction to be monitored at a first trace point of the processing system, code for associating a first trace tag identifier with the first transaction, at the first trace point, and code for identifying the first transaction at one or more other trace points of the processing system based on the first trace tag identifier.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1:
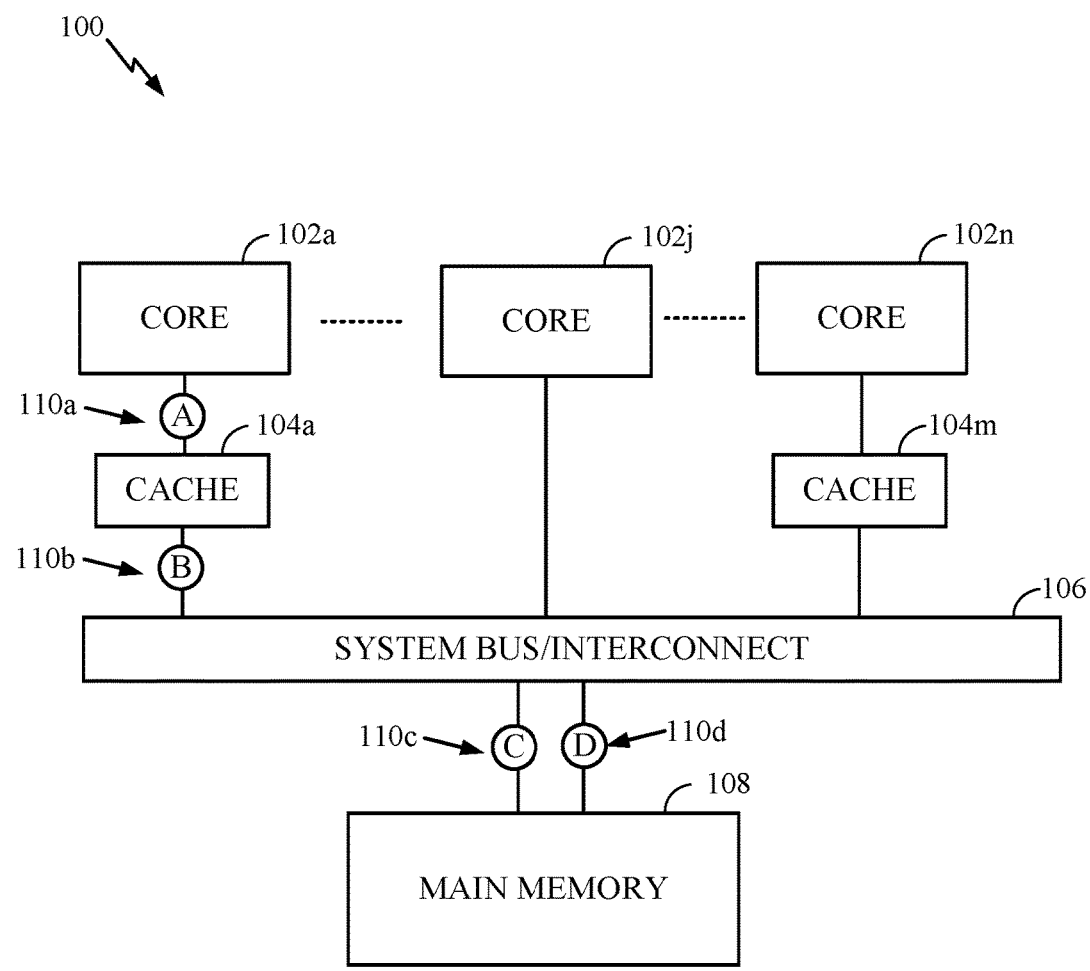
FIG. 1 is schematic view of an example processing system configured according to exemplary aspects.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In exemplary aspects of this disclosure, the ability to monitor and analyze performance of transactions, as they traverse through a processing system, is provided. Performance counters are provided at selected nodes of the processing system, which can be used to identify particular transactions to be monitored (e.g., based on transactions being observed at least a specified number of times at a node). The identified transactions can be tagged with trace tag identifiers. When and if a tagged transaction passes through a node, a timestamp is associated with the tagged transaction. In this manner, the various times at which a tagged transaction appeared at various nodes of the processing system can be obtained, which provides insight into latencies and performance of the tagged transactions.

With reference now to FIG. 1, processing system 100, configured according to exemplary aspects, will be described. FIG. 1 illustrates a schematic view of processing system 100. Processing system 100 can be any special purpose or general purpose system-on-chip (SoC), for example. Processing system 100 may comprise one or more cores 102*a-n*, as shown. Cores 102*a-n* may be any agent, processor, or computing device such as a central processing unit (CPU), digital signal processor (DSP), general purpose processor (GPU), input/output device, interface device, etc. Some of cores 102*a-n* may have one or more caches and/or other local memory devices, representatively illustrated as caches 104*a-m*. Cores 102*a-n*, and where applicable, caches 104*a-m* may be coupled to one another and to main memory 108 through a system bus or interconnect 106. The particular arrangement and interconnections between the various above-described components may be referred to as a "system fabric" of processing system 100. Exhaustive details of the various components of processing system 100 will not be provided herein, but relevant aspects which are germane to this disclosure will be explained with the system fabric as illustrated.

In more detail, numerous transactions may traverse through the system fabric of processing system 100, which may be responsive to various commands between different sources and destinations. It may be desirable to identify particular ones of these transactions and monitor their performance Furthermore, it may be desirable to determine location information related to origin and destination of the transactions. To this end, one or more performance counters are provided at select nodes or entry points (and/or exit points) within the system fabric. Performance counters may already be available in some processing systems to measure general system metrics such as overall latencies, average throughput, etc., which may not be specific to any particular one or more transactions. Accordingly, in some of the nodes, pre-existing performance counters can be deployed or repurposed, without incurring additional hardware. Performance of specific transactions can be monitored at these nodes using the performance counters in exemplary aspects, and therefore, the node at which transactions are monitored are also referred to herein as trace points.

With continuing reference to FIG. 1, example trace points A-D are particularly identified and associated with reference numerals 110*a-d*, respectively. Trace points A-D 110*a-d* can include one or more performance counters (e.g., implemented as hardware counters, which will be discussed further with reference to FIGS. 2A-B. As shown in FIG. 1, trace point A 110*a* can be located between core 102*a* and cache 104*a*, and commands issued from core 102*a* to cache 104*a* (e.g., load/store commands) may pass through trace point A 110*a*, for example. Trace point B 110*b* can be located between cache 104*a* and interconnect 106, and commands which miss in cache 104*a* may pass through trace point B 110*b*, for example. Trace point C 110*c* can be located between interconnect 106 and main memory 108, and commands transferred from interconnect 106 to main memory 108 may pass through trace point C 110*c*, for example. Trace point D 110*d* may also be located between interconnect 106 and main memory 108, for example, on networks or buses in the reverse direction as those relative to trace point C 110*c*, such that transactions (e.g., data corresponding to load requests) returned from memory 108 to interconnect 106 may pass through trace point D 110*d*. Identifying particular transactions and monitoring them as they pass through example trace points A-D 110*a-d* will now be described with reference to FIG. 2A.

Figure 2A:
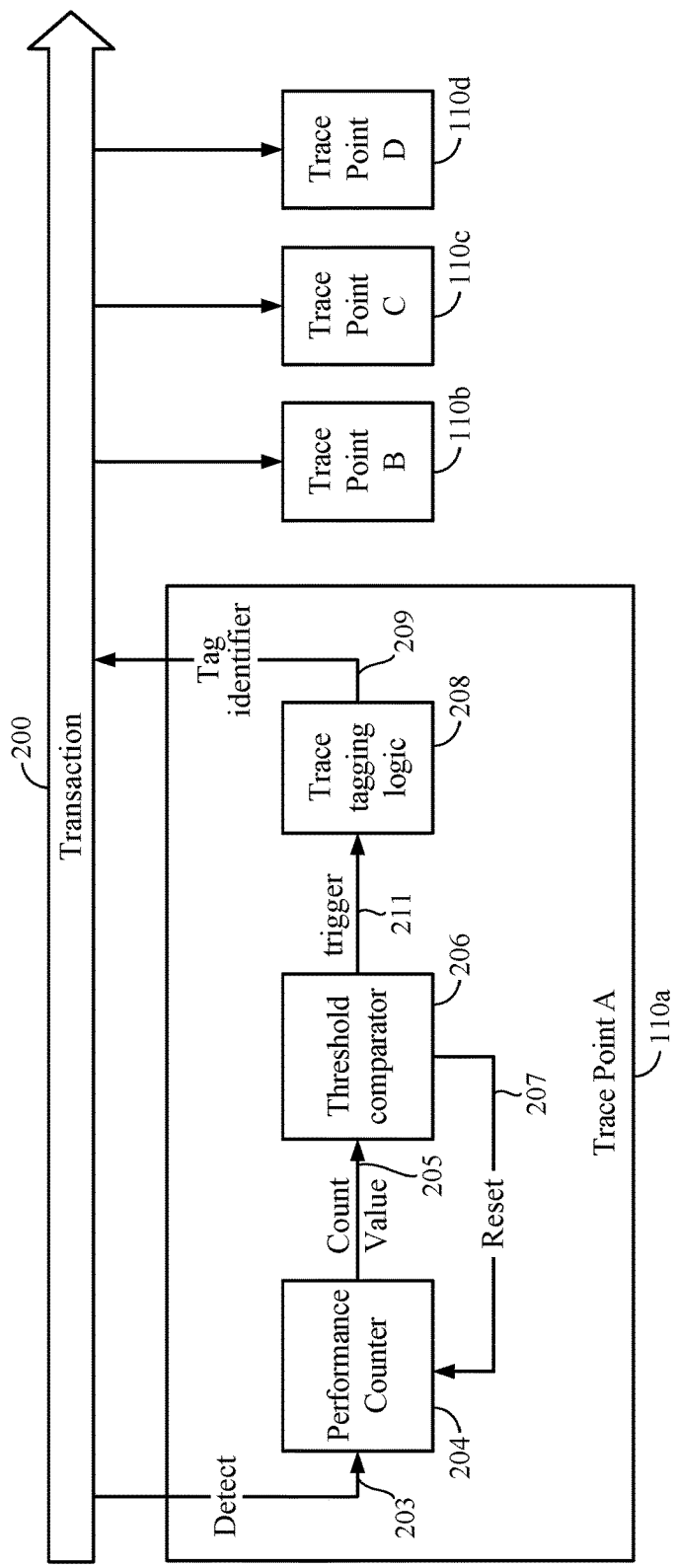
FIGS. 2A-B illustrate transaction flows for example transactions according to aspects of this disclosure.

FIG. 2A illustrates a schematic view for the flow of a particular transaction 200 as it traverses trace points A-D 110*a-d*. An exploded view of trace point A 110*a* is shown in FIG. 2A. The remaining trace points B-D 110*b-d* can be similarly implemented, or their implementation can be modified to suit specific purposes that individual trace points are designed for (keeping in mind that some trace points may implement performance counters while some trace points may also be designed for tracing alone and not performance monitoring as well). At trace point A, signal detect 203 is asserted when transaction 200 is detected. Transaction 200 can be detected based on any attribute of transaction 200 (e.g., address, operational code (op-code), mode, transaction type, etc.). Performance counter 204 can include a hardware counter which can be incremented every time -signal detect 203 is asserted, i.e., every time transaction 200 is detected at trace point A, to provide count value 205. Count value 205 is compared in threshold comparator 206 to a pre-selected threshold (not explicitly identified in the figure). The threshold may be based on any suitable metric, used to determine which transactions are to be monitored. If transaction 200 is observed more than the threshold number of times, i.e., count value 205 is greater than the threshold, then threshold comparator 206 asserts trigger 211. Trigger 211 is a control signal which triggers or causes trace tagging logic 208 to tag transaction 200. By tagging transaction 200 in this manner, transaction 200 is identified as a transaction to be monitored.

In addition to asserting trigger 211 when count value 205 is greater than the threshold, threshold comparator 206 also asserts reset 207. Reset 207 is a reset signal used to reset performance counter 204, and more specifically, count value 205 to zero. By resetting count value 205 to zero every time trigger 211 is asserted to cause trace tagging logic 208 to tag a transaction, the above process may be repeated and transaction 200 may be periodically tagged each time count value 205, starting from a reset, exceeds the threshold.

As noted above, when trigger 211 is asserted, trace tagging logic 208 appends a trace tag identifier 209 to transaction 200 to identify transaction 200 as a transaction to be monitored (e.g., in processing system 100 of FIG. 1), as transaction 200 passes through one or more other trace points such as trace points B-D 110*b-d*. Tag identifier 209 can comprise a tag or sequence of bits used to identify transaction 200. Transaction 200 carries tag identifier 209 as it flows through the rest of the system fabric, e.g., through trace points B-D 110*b-d*, even if transaction 200 splits into multiple phases. Each of trace points A-D 110*a-d* can also detect a transaction based on its identifier. For example, trace points B-D 110*b-d* may detect that transaction 200 was observed as transaction 200 flows through processing system 200, based on tag identifier 209. The time point at which transaction 200 is detected at a trace point is identified and a corresponding time stamp is associated with that time point. The time stamp along with a transaction's identifier, e.g., tag identifier 209 for transaction 200, may be stored in each of trace points A-D 110*a-d*.

In one example, each of trace points A-D 110*a-d* may be operated at a common clock or clocks which are synchronized across all the trace points of processing system 100. Based on the common clock or synchronized clocks, time points at which transaction 200 is observed can be determined. Accordingly, at each of trace points B-D 110*b-d*, time stamps are generated based on the time points at which transaction 200 is observed, and the time stamps are logged.

Tracing mechanisms such as an Embedded Trace Macrocell (ETM) are known in the art for debugging software executing on a processor, for example. The tracing mechanisms may involve capturing real-time information about the software's execution flow. In exemplary aspects, the trace information, e.g., for use by such tracing mechanisms, can be obtained from the time stamps associated with the flow of a transaction through processing system 100. For example, trace information for transaction 200 can be obtained from the time stamps at which transaction 200 is observed at the various trace points A-D 110*a-d*. This trace information can be provided to tracing mechanisms such as an ETM or an external trace analyzer as known in the art. Furthermore, aspects such as latencies associated with transactions, can also be derived from the time stamps, as will be discussed in the following sections.

Based on the time stamps, latencies related to transaction 200 can be determined between any two or more points of interest. In exemplary aspects, latency of transaction 200 between at least two of the trace points available in the system fabric (e.g., trace points A-D 110*a-d*) can be determined based on the time stamps. For example, using the time stamp at which transaction 200 passed trace point B 110*b*, when transaction 200 was issued from interconnect 106 to memory 108 and the time stamp at which transaction 200 (or data corresponding to transaction 200, also tagged with tag identifier 209) is returned from memory 108, the latency of memory 108 for handling transaction 200 can be identified. In like manner, latencies to/from any other agent, as well as fabric latencies (e.g., latency of buses between interconnect 106 and memory 108 in the above example) for transactions can be determined.

It will also be appreciated that in addition to latencies, other tracing information can also be obtained at trace points, such as tracing information related to responses from the agents for transaction 200 (e.g., whether transaction 200 resulted in a retry, cache states of a cache line accessed, such as: dirty, exclusive, shared among multiple processors, etc. as known in the art). Furthermore, identifying and tagging transactions at the various trace points can also assist in deriving metrics such as cache hit/miss rates which comprise a cache access, (e.g., by studying the number of transactions which pass through trace point A 110*a* for transactions comprising to cache requests originating from core 102*a* to cache 104*a*, and of those, the number of transactions which miss in cache 104*a* to pass through trace point B 110*b*). In some cases, using the tagging mechanisms at trace points (e.g., as shown and described with reference to trace point A 110*a* in FIG. 2A), information regarding localities on the system fabric to which transactions are directed can also be identified. For example, for the multiple caches 104*a-m* in processing system 100 of FIG. 1, trace points A-D 110*a-d* may be configured to assist in identifying proximity of data to a consuming device, or locality of a consuming device of transaction 200, in processing system 100, by tagging transactions according to exemplary aspects described above (e.g., which one of caches 104*a-m* may comprise data requested from cores 102*a-n* can be identified based on transaction 200 identified at the various trace points). Determining such proximity can assist software or operating systems to organize data (e.g., in caches 104*a-m*) to be located in close proximity to corresponding consuming or requesting devices (e.g., cores 102*a-n*).

It will be appreciated that since the performance counters can be used for identifying and tagging multiple transactions, providing dedicated tenure counters for individual transactions can be avoided, thus providing a low-cost solution for identifying and monitoring individual transactions of interest (e.g., transactions which are observed a certain number of times at a trace point). Based, for example, on count value 205 obtained from performance counter 204, the number of times transaction 200 traversed through trace point A 110*a* within a specified time period can be obtained. Similarly, the number of times a tagged transaction passed through various trace points and related time stamps can also be obtained. The count values at the various trace points, along with time stamps provided by the trace points for a tagged transaction can be used to profile bandwidth or resource consumption of particular transactions. Furthermore, one or more of trace points A-D 110*a-d* may be configured to determine one or more of cache states, retries, cache hit/miss rates of transaction 200 based on trace tag identifier 209 of transaction 200. Accordingly, metrics such as the number of retries, address locations targeted, cache states, quality of service (QoS), etc., for particular transactions can be obtained from trace points A-D 110*a-d*. Since desired information for particular transactions can be gathered in a targeted manner from the various trace points, filtering through large quantities of data (e.g., as logged by conventional tracing mechanisms) can be avoided in some aspects.

Figure 2B:
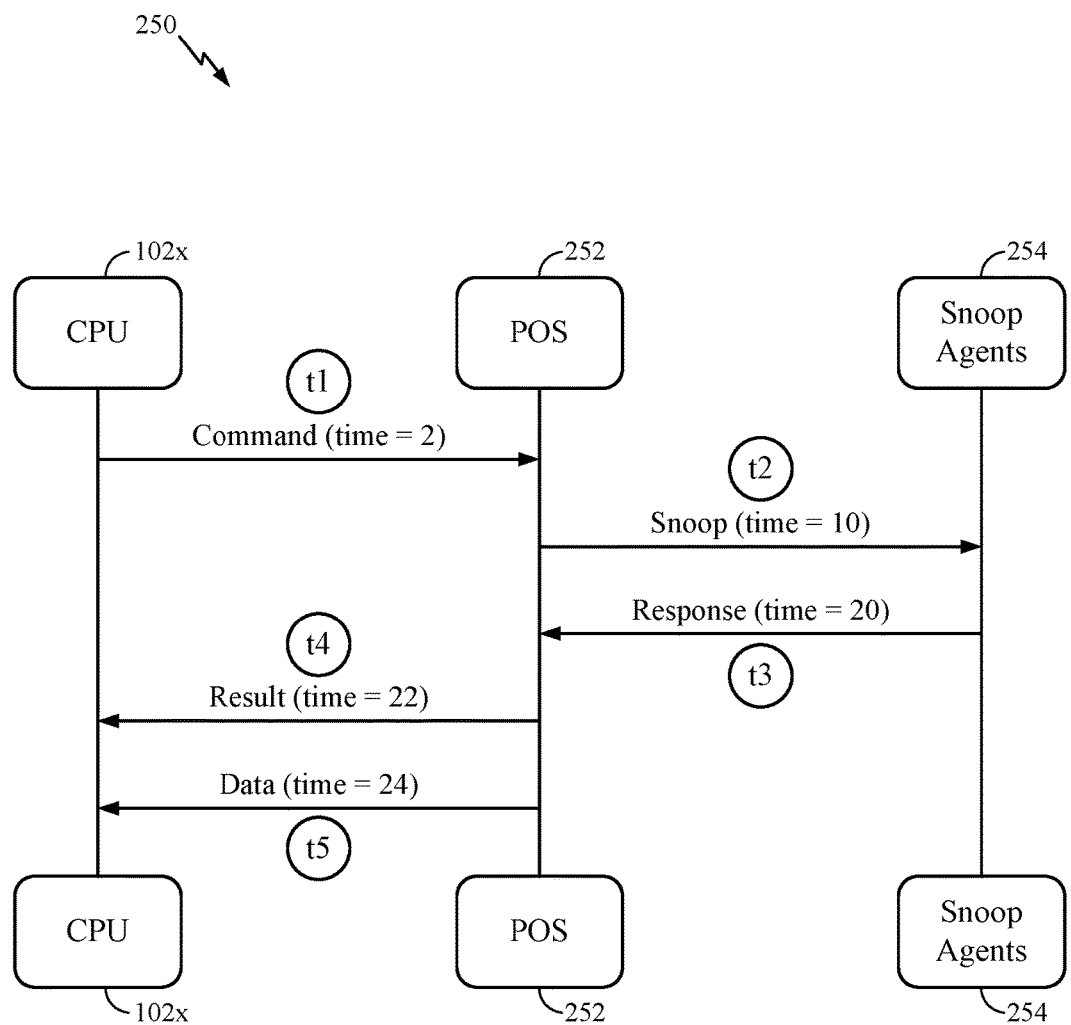

For example, with reference now to FIG. 2B, an exemplary aspect pertaining to identifying latencies for a transaction is illustrated. FIG. 2B illustrates processing system 250 (e.g., an aspect of processing system 100) comprising a central processing unit (CPU) 102x (e.g., one of the cores 102a-n shown in FIG. 1), a point-of-serialization (POS) 252, and snoop agents 254. As known in the art, when multiple cores share common resources such as a common cache or memory (not shown in this view), then data coherency may be tracked to ensure that stale data is not incorrectly used by the cores. To this end, CPU 102x, which may share resources with one or more other cores 102a-n, can send transactions to POS 252, from where the transactions can be provided to one or more snoop agents 254 which can be configured to snoop other cores or shared caches to determine if coherency issues exist. Trace points (similar to the above-described trace points A-D 110a-d) may be provided at multiple points in the system fabric of processing system 250, and a particular command may be identified as a transaction to be monitored.

In FIG. 2B, numerous time stamps related to the transaction are shown. These time stamps may be generated by corresponding trace points, based on when time points at which a transaction is observed and the transaction may be tagged at the trace points using corresponding time stamps. For example, a command issued from CPU 102x to POS 252 may be identified at time t1 (e.g., time=2 ns) based on an associated tag identifier provided by a corresponding trace point, and the command may be tagged using a time stamp corresponding to time t1. At time t2 (e.g., time=10 ns), a corresponding snoop request may be sent from POS 252 to snoop agents 254, and similarly, the snoop request may be tagged using a time stamp corresponding to time point t2. At time t3 (e.g., time=20 ns), snoop agents 254 may return a snoop response, which may be tagged with a time stamp corresponding to time t3. Based on the snoop response, at time t4 (e.g., time=22 ns), POS 252 may send the result of the snoop operation (tagged with a time stamp corresponding to time point t4); and at time t5 (e.g., time=24 ns), POS 252 may send the requested data (tagged with a time stamp corresponding to time point t5), back to CPU 102x. Using the various time stamps corresponding to time points t1-t5, it is possible to determine performance of the various agents for the particular transaction. For example, performance of snoop agents 254 or latency of snoop agents 254 can be measured based on time stamps corresponding to time points t2, t3 (e.g., latency is t3−t2=10 ns). Similarly, the latency of POS 252 can be observed with relation to when the result was received based on time stamps corresponding to time points t4 and t1 (e.g., t4−t1=20 ns) and/or with relation to when the data was received based on time stamps corresponding to time points t5 and t1 (e.g., t5−t1=22 ns). In this manner, a transaction can be identified based on its tag at the various trace points, and the time stamps at the various trace points can be used to determine information such as latency, and correspondingly, performance of the transaction.

Figure 3:
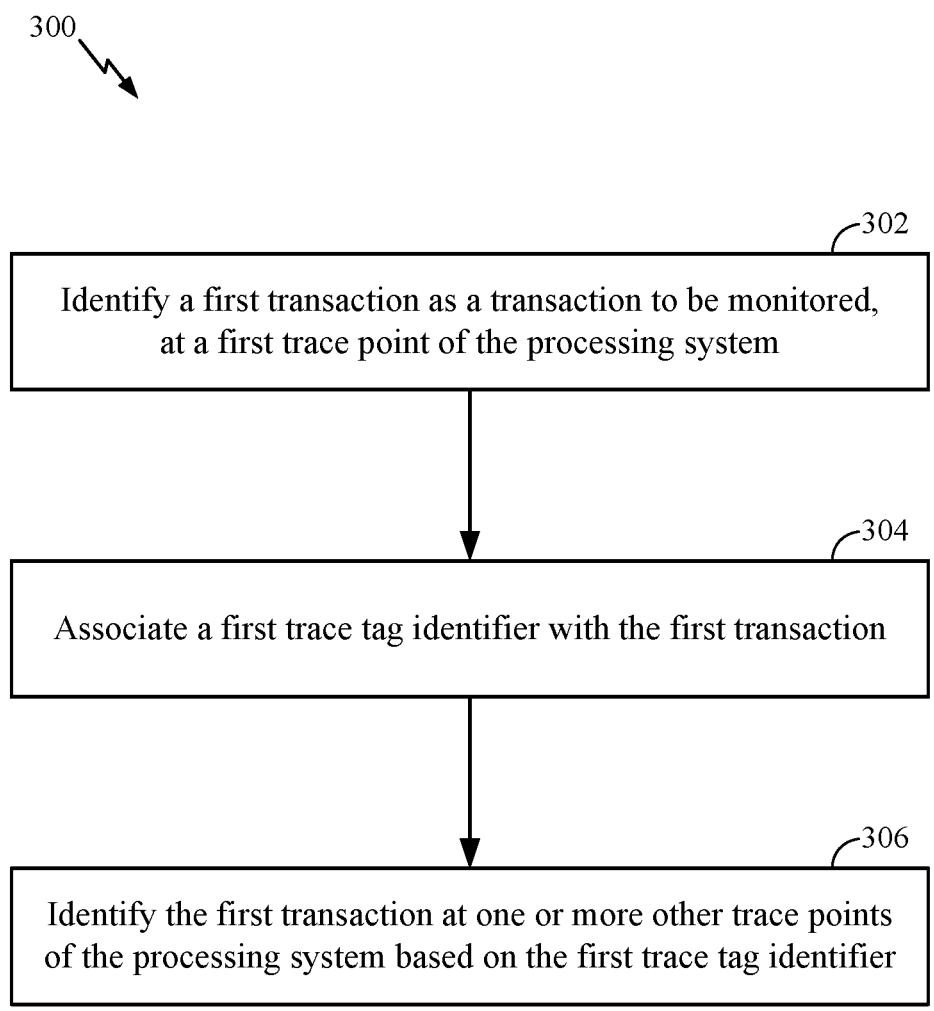
FIG. 3 illustrates a flow-chart for a method of performance analysis, according to exemplary aspects.

Accordingly, it will be appreciated that exemplary aspects include various methods for performing the processes, functions and/or algorithms disclosed herein. For example, FIG. 3 illustrates a method 300 of analyzing performance of a processing system.

For example, as shown in Block 302, method 300 comprises identifying a first transaction as a transaction to be monitored at a first trace point of the processing system (e.g., identifying transaction 200 as a transaction to be monitored at trace point A 110a). In some cases, identifying the first transaction as a transaction to be monitored may be based on detecting the first transaction (e.g., by detecting the first transaction based on an attribute of the first transaction at performance counter 204, wherein the attribute can comprise at least one of an address, an operational code, a mode, or a type of the first transaction), determining that the first transaction has been detected at least a threshold number of times at the first trace point (e.g., by counting the number of times transaction 200 was observed by performance counter 204 in trace point A 110a) and comparing (e.g., in threshold comparator 206) the number of times the first transaction is detected, to a threshold.

Block 304 comprises associating a first trace tag identifier (e.g., tag identifier 209) with the first transaction. In some aspects, method 300 may further include resetting the performance counter (e.g., using the signal, reset 207) when the first transaction is detected at least the threshold number of times at the first trace point.

Block 306 comprises identifying the first transaction at one or more other trace points of the processing system based on the first trace tag identifier (e.g., detecting transaction 200 at trace points B-D 110b-d using tag identifier 209). In some aspects, method 300 may further include determining time stamps at which the first transaction is identified at the first trace point and the one or more other trace points (e.g., the time stamps may be generated or determined based on time points at which the first transaction is observed at corresponding trace points), and determining trace information for the first transaction from the time stamps. Further, a latency of the first transaction between at least two trace points of the first trace point and the one or more other trace points can also be determined based on the time stamps (e.g., based on a difference between two time stamps, as explained with reference to FIG. 2B).

In some exemplary aspects, the first trace point (e.g., trace point A 110a) is located at an entry point of an agent (e.g., core 102a) coupled to a system fabric of the processing system 100. Method 300 may further include determining locality in the processing system, of a consuming device (e.g., core 102a or main memory 108) of the first transaction, based on the first trace tag identifier. Exemplary aspects can also include determining one or more of cache states, retries, cache hit/miss rates of the first transaction based on the first trace tag identifier, wherein the first transaction comprises a cache access.

It will also be appreciated that exemplary aspects include various means for performing the functions discussed herein. For example, an apparatus (e.g., processing system 100) can include means for identifying a first transaction as a transaction to be monitored at a first means for tracing (e.g., trace point A 110a comprising performance counter 204), means for associating a first trace tag identifier with the first transaction (e.g., trace tagging logic 208), at the first means for tracing; and means for identifying the first transaction at one or more other means for tracing in the processing system, based on the first trace tag identifier (e.g., similar performance counters or other means in trace points B-D 110b-d for detecting or identifying transaction 200 using its tag identifier 209).

The apparatus can further include means for detecting the first transaction at least a threshold number of times at the first means for tracing (e.g., threshold comparator 206). The apparatus can also include means for determining time stamps at which the first transaction is identified at the first means for tracing and the one or more other means for tracing (e.g., a common clock or synchronized clocks for providing time points at which the first transaction is identified at the various trace points A-D 110a-d, wherein the time stamps are generated or determined by logic (not shown) to correspond to the time points). The apparatus may also include means for determining trace information for the first transaction from the time stamps (e.g., storage media can be provided for logging time stamps at which transaction 200 is identified at various trace points A-D, wherein the logged time stamps may be provided to tracing mechanisms). In some aspects, the apparatus can include means for determining a latency of the first transaction between at least two means for tracing of the first means for tracing and the one or more other means for tracing based on the time stamps (e.g., logic, not explicitly shown, for determining a difference between two time stamps at which transaction 200 was observed at corresponding two trace points).

Figure 4:
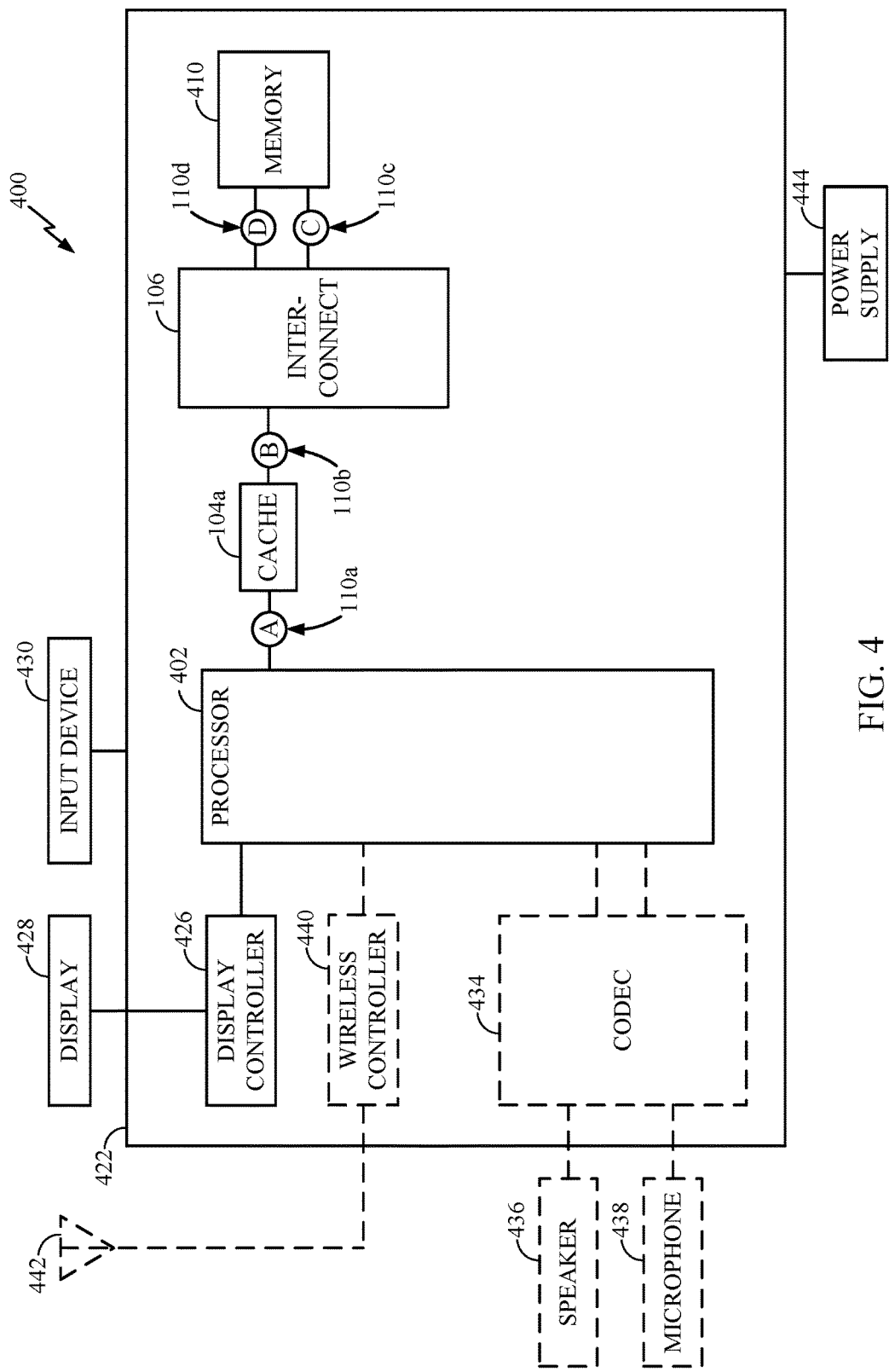
FIG. 4 illustrates a computing device in which an aspect of the disclosure may be advantageously employed.

An example apparatus in which exemplary aspects of this disclosure may be utilized, will now be discussed in relation to FIG. 4. FIG. 4 shows a block diagram of computing device 400, which includes processor 402, which may be configured as one of cores 102a-n, and specifically, core 102a, discussed, for example, with reference to FIG. 1. Correspondingly, cache 104a, interconnect 106, and related trace points A-D 110a-d shown and discussed in relation to FIG. 1 are also shown. Memory 410 of FIG. 4 may be configured similar to main memory 108 of FIG. 1. Numerous other details of processing system 100 shown in FIG. 1 may be applicable to FIG. 4, but these details have been omitted in FIG. 4 for the sake of clarity, and it will be understood that they may be configured similarly as described with reference to FIGS. 1 and 2A-B. Computing device 400 may be configured to perform method 300 of FIG. 3 in exemplary aspects.

In FIG. 4, processor 402 is shown to be communicatively coupled to memory 410 (e.g., via cache 104a and interconnect 106, while keeping in mind that other interconnections between processor 402 and memory 410 may also be possible). FIG. 4 also shows display controller 426 that is coupled to processor 402 and to display 428.

In some aspects, FIG. 4 may include some optional blocks showed with dashed lines. For example, computing device 400 may optionally include coder/decoder (CODEC) 434 (e.g., an audio and/or voice CODEC) coupled to processor 402; speaker 436 and microphone 438 coupled to CODEC 434; and wireless controller 440 (which may include a modem) coupled to wireless antenna 442 and to processor 402.

In a particular aspect, where one or more of the above-mentioned optional blocks are present, processor 402, display controller 426, memory 410, CODEC 434, and wireless controller 440 can be included in a system-in-package or system-on-chip device 422. Input device 430, power supply 444, display 428, speaker 436, microphone 438, wireless antenna 442, and power supply 444 may be external to system-on-chip device 422 and may be coupled to a component of system-on-chip device 422, such as an interface or a controller.

It should be noted that although FIG. 4 generally depicts a computing device, processor 402 and memory 410, may also be integrated into a set top box, a music player, a server, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for performance analysis of transactions in a processing system. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of analyzing performance of a processing system, the method comprising:
   identifying a first transaction as a transaction to be monitored, at a first trace point of the processing system, based on detecting the first transaction at least a threshold number of times at the first trace point, wherein detecting the first transaction at least the threshold number of times at the first trace point comprises counting, in a performance counter provided at the first trace point, a number of times the first transaction is detected at the first trace point and comparing the number of times the first transaction is detected, to a threshold;

associating a first trace tag identifier with the first transaction, at the first trace point;
identifying the first transaction at one or more other trace points of the processing system based on the first trace tag identifier;
determining time stamps at which the first transaction is identified at the first trace point and the one or more other trace points; and
determining trace information for the first transaction from the time stamps.

2. The method of claim 1, comprising detecting the first transaction based on an attribute of the first transaction.

3. The method of claim 2, wherein the attribute comprises at least one of an address, an operational code, a mode, or a type of the first transaction.

4. The method of claim 1, further comprising resetting the performance counter when the first transaction is detected at least the threshold number of times at the first trace point.

5. The method of claim 1, further comprising determining a latency of the first transaction between at least two trace points of the first trace point and the one or more other trace points based on the time stamps.

6. The method of claim 1, wherein the first trace point is located at an entry point of an agent coupled to a system fabric of the processing system.

7. The method of claim 1, further comprising determining locality in the processing system, of a consuming device of the first transaction, based on the first trace tag identifier.

8. The method of claim 1, further comprising determining one or more of cache states, retries, and cache hit/miss rates of the first transaction based on the first trace tag identifier, wherein the first transaction comprises a cache access.

9. A processing system comprising:
a first trace point comprising:
a performance counter configured to count a number of times a first transaction is detected at the first trace point; and
a threshold comparator configured to compare the number of times the first transaction is detected at the first trace point to a threshold, wherein the first trace point is configured to identify the first transaction as a transaction to be monitored if the first transaction is detected at least a threshold number of times at the first trace point;
trace tagging logic, provided at the first trace point, configured to associate a first trace tag identifier with the first transaction, wherein the threshold comparator is configured to generate a trigger to cause the trace tagging logic to associate the first trace tag identifier with the first transaction if the number of times the first transaction is detected at the first trace point is greater than the threshold; and
one or more other trace points of the processing system, configured to identify the first transaction based on the first trace tag identifier,
wherein the first trace point and the one or more other trace points are configured to determine time stamps at which the first transaction is identified at the corresponding first trace point and the one or more other trace points; and determine trace information for the first transaction from the time stamps.

10. The processing system of claim 9, wherein the threshold comparator is further configured to generate a reset signal to reset the performance counter if the number of times the first transaction is detected at the first trace point is greater than the threshold.

11. The processing system of claim 9, wherein the performance counter is configured to detect the first transaction based on an attribute of the first transaction.

12. The processing system of claim 11, wherein the attribute comprises at least one of an address, an operational code, a mode, or a type of the first transaction.

13. The processing system of claim 9, wherein at least two trace points of the first trace point and the one or more other trace points are configured to determine a latency of the first transaction between the at least two trace points based on the time stamps.

14. The processing system of claim 9, wherein the first trace point is located at an entry point of an agent coupled to a system fabric of the processing system.

15. The processing system of claim 9, wherein one or more of the first trace point and the one or more other trace points are configured to determine locality in the processing system, of a consuming device of the first transaction, based on the first trace tag identifier.

16. The processing system of claim 9, wherein the first transaction comprises a cache access, and wherein one or more of the first trace point and the one or more other trace points are configured to determine one or more of cache states, retries, and cache hit/miss rates of the first transaction based on the first trace tag identifier.

17. The processing system of claim 9, integrated into a device selected from the group consisting of a set top box, a music player, a server, a video player, an entertainment unit, a navigation device, a personal digital assistant (PDA), a fixed location data unit, a computer, a laptop, a tablet, a communications device, and a mobile phone.

18. An apparatus comprising:
means for identifying a first transaction as a transaction to be monitored at a first means for tracing in a processing system, based on means for detecting the first transaction at least a threshold number of times at the first means for tracing, wherein the means for detecting comprises: means for counting, provided at the first means for tracing, a number of times the first transaction is detected at the first means for tracing; and means for comparing the number of times the first transaction is detected, to a threshold;
means for associating a first trace tag identifier with the first transaction, at the first means for tracing;
means for identifying the first transaction at one or more other means for tracing in the processing system, based on the first trace tag identifier;
means for determining time stamps at which the first transaction is identified at the first means for tracing and the one or more other means for tracing; and
means for determining trace information for the first transaction from the time stamps.

19. The apparatus of claim 18, further comprising means for determining a latency of the first transaction between at least two means for tracing of the first means for tracing and the one or more other means for tracing based on the time stamps.

20. A non-transitory computer-readable storage medium comprising code, which, when executed by a processor, causes the processor to perform operations analyzing performance of a processing system, the non-transitory computer-readable storage medium comprising:
code for identifying a first transaction as a transaction to be monitored at a first trace point of the processing system, based on detecting the first transaction at least a threshold number of times at the first trace point, wherein detecting the first transaction at least the threshold number of times at the first trace point comprises code for counting a number of times the first transaction is detected at the first trace point; and code for comparing the number of times the first transaction is detected, to a threshold;

code for associating a first trace tag identifier with the first transaction, at the first trace point;

code for identifying the first transaction at one or more other trace points of the processing system based on the first trace tag identifier code for determining time stamps at which the first transaction is identified at the first trace point and the one or more other trace points; and code for determining trace information for the first transaction from the time stamps.

21. The non-transitory computer-readable storage medium of claim 20, further comprising code for determining a latency of the first transaction between at least two trace points of the first trace point and the one or more other trace points based on the time stamps.

22. The non-transitory computer-readable storage medium of claim 20, further comprising code for determining locality in the processing system, of a consuming device of the first transaction, based on the first trace tag identifier.

23. The non-transitory computer-readable storage medium of claim 20, further comprising code for determining one or more of cache states, retries, and cache hit/miss rates of the first transaction based on the first trace tag identifier, wherein the first transaction comprises a cache access.

* * * * *